Sept. 5, 1961 C. W. WHEELOCK ET AL 2,999,058
NUCLEAR REACTOR FUEL ELEMENT
Filed Jan. 28, 1958 2 Sheets-Sheet 1
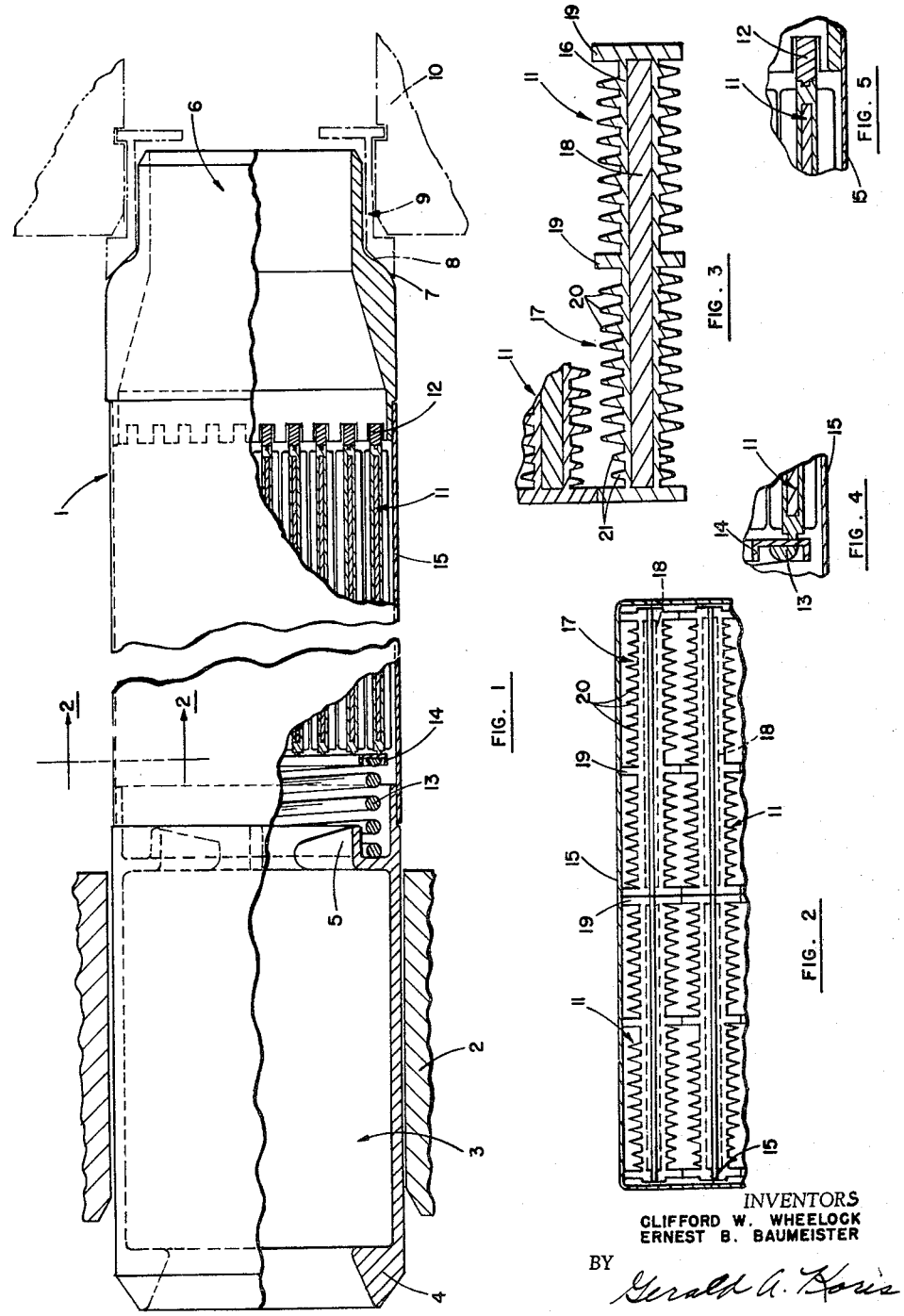
INVENTORS
CLIFFORD W. WHEELOCK
ERNEST B. BAUMEISTER
BY
Gerald A. Koris
ATTORNEY Sept. 5, 1961 C. W. WHEELOCK ET AL 2,999,058
NUCLEAR REACTOR FUEL ELEMENT
Filed Jan. 28, 1958 2 Sheets-Sheet 2

INVENTORS
CLIFFORD W. WHEELOCK
ERNEST B. BAUMEISTER
BY
*Gerald G. Korn*
ATTORNEY the accompanying drawings and the attached claims.

Figure 7:
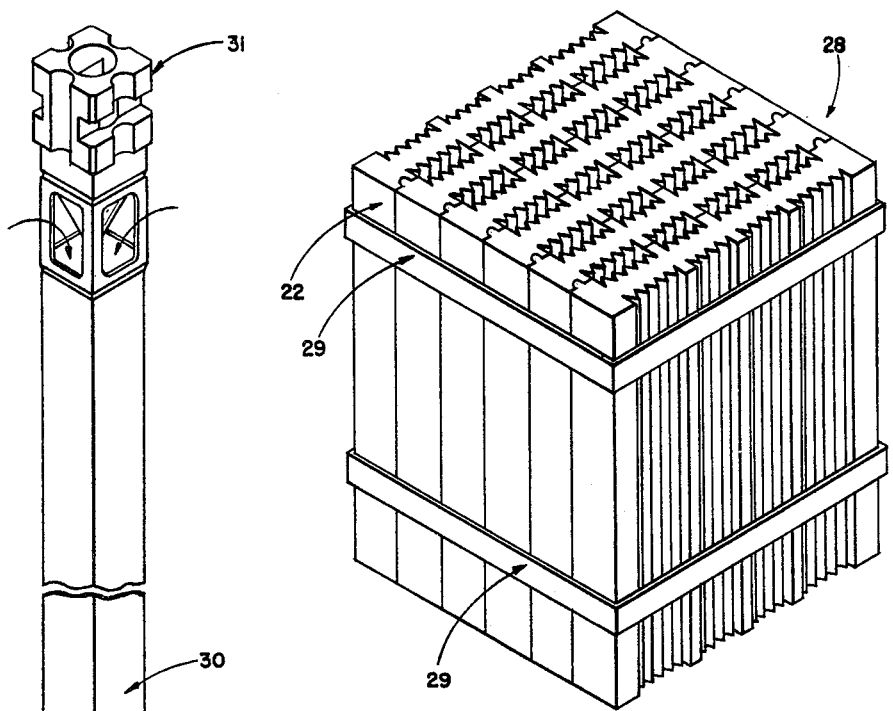
Figures 6, 8:
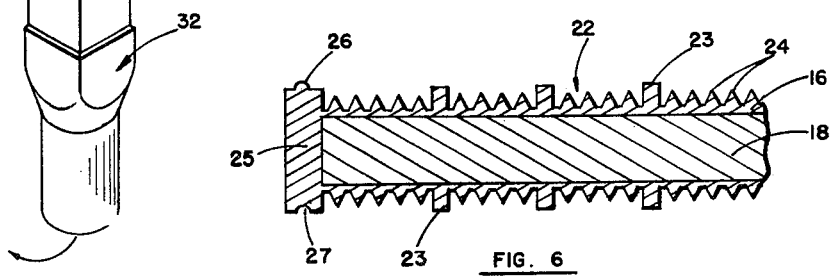

FIGURE 1 is an elevation view, partly in section of the fuel element, FIGURE 2 is a section through FIGURE 1, FIGURE 3 is an enlarged portion of FIGURE 2, and FIGURES 4 and 5 are enlarged fragments of FIGURE 1. FIGURES 6–8 represent an alternate embodiment of our invention. FIGURE 6 is a section of an alternate fuel plate. FIGURE 7 is a bundle of such fuel plates and FIGURE 8 an exterior view of a fuel element with alternate head and insertion pieces.

2,999,058
NUCLEAR REACTOR FUEL ELEMENT

Clifford W. Wheelock, Canoga Park, and Ernest B. Baumeister, Malibu, Calif., assignors, by mesne assignments, to the United States of America as represented by the United States Atomic Energy Commission
Filed Jan. 28, 1958, Ser. No. 711,595
5 Claims. (Cl. 204—193.2)

Our invention relates to a nuclear reactor fuel element, and more particularly to an improved fuel element for an organic moderated reactor.

For a detailed description of an organic moderated reactor, reference is made to Reports NAA-SR-1700 and NAA-SR-1800, available from the Office of Technical Services, Department of Commerce, Washington 25, D.C.

Heretofore, plate or MTR-type fuel elements have been considered for organic moderated reactors. For information concerning the plate type fuel element and its method of fabrication, attention is invited to the Geneva Conference paper of J. E. Cunningham and E. J. Boyle entitled "MTR-type Fuel Elements" ("The Proceedings of the International Conference on the Peaceful Uses of Atomic Energy," Geneva, Switzerland, August 1955; available for sale from the United Nations Book Store, New York, New York). The typical plate-type fuel element comprises a plurality of long, slightly curved or flat plates, each plate comprising a core of uranium-aluminum alloy or a sintered compact of $UO_2$-stainless steel with a thin cladding of aluminum or stainless steel, resulting in a sandwich-type construction. The cladding is used to retain fission products in the fuel and to protect the uranium from corrosion or other damage by the coolant. The plates are fitted into longitudinal grooves in a hollow, rectangular frame and are welded or brazed to the supporting frame to give a mechanically rigid assembly.

A disadvantage of the current plate fuel element is that heat generated in fuel plates results in the plates maintaining a higher temperature than the bulk temperature of the coolant. The structural parts of the fuel element, wherein no heat is generated, remain at the bulk temperature of the coolant. The restrained differential expansion resulting from the temperature difference between these parts can result in serious thermal stress problems. The problem in organic cooled reactors is aggravated because of the poor heat transfer characteristics of organic as compared with liquid metal or even aqueous coolants. If the thermal gradients are uncompensated for, severe stresses result, leading to distortions, hot spots, and fuel element failure may result. Furthermore, the heat transfer area across the plate is not satisfactory for the removal of sufficient heat. This would require either an increase in coolant flow rate or higher operating temperatures. Increased pumping capacity would add to the capital cost of the plant, and the organic medium decomposes rapidly above a certain temperature.

An object of our present invention, therefore, is to provide an improved reactor fuel element.

Another object is to provide an improved reactor fuel element for an organic moderated reactor.

Another object is to provide an improved plate-type fuel element for an organic moderated reactor.

Another object is to provide such a fuel element of improved heat transfer characteristics.

Still another object is to provide such a fuel element wherein thermal stress problems will be minimized.

Yet another object is to provide such a fuel element wherein differential expansion may be accommodated without distortion, hot spots, or other conditions leading to fuel element failure.

Further objects and advantages of our invention will become apparent from the following detailed description, taken together with the accompanying drawings and the attached claims.

In FIGURE 1 the fuel element 1 is shown as it would be positioned in a reactor core. The element is inserted through an upper grid plate 2 which serves as an insertion and positioning guide. The head piece 3 is a hollow rectangle provided with prongs 4 adapted for engagement by a handling device for insertion and removal of the fuel element from the reactor. Web guards 5 prevent the handling device from damaging fuel element components. The end piece 6 is hollow and tapered and its shoulder 7 rests on the shoulder 8 of an orifice plate 9 (for adjusting coolant flow) which in turn rests on the bottom grid plate 10 of the reactor. This arrangement permits fuel elements and orifice plates to be changed separately. The design of the top and bottom pieces is not critical and various shapes may be used, depending on the fuel handling mechanism employed and the shape of the grid plates. The fuel plates 11 are rectangular and positioned parallel to one another. The plates are not rigidly held by brazing or welding as in the prior art. Instead, each plate is supported by a cross bar 12 as shown in the enlarged fragment of FIGURE 5. The top end of each plate is pressed downwardly by a spring 13 as shown in FIGURE 1. The lower portion of the spring terminates in a cup washer 14. The spring 13 controls the motion of the fuel plates 11 so that axial expansion of the fuel plates will be thereagainst upon any differential thermal expansion. The plates are therefore essentially "floating" and distortion-caused fuel element failure is avoided by accommodating expansion. The shell 15 of the fuel bearing portion of the assembly and the top and bottom pieces 3 and 6 overlap and are welded together to form a container for the fuel plates.

In FIGURES 2 and 3 are seen the fuel plates. The cladding 16 of plates 11 has axially continuous serrations or fins 17 thereon and a core 18 of fissile material. It is found that such fins increase the heat transfer capabilities of the heat element markedly (by a factor of 2½) over that of the flat plate element under the same conditions. As seen in FIGURES 2 and 3 the plate has a core of fissile material and periodic rectangular squared fins 19 which are relatively longer than the pointed fins 20. The squared fins 19 on succeeding plates contact each other, and thereby space and provide lateral support for the fuel plates, the axial support being provided by the spring 13 and guide bars 12. In the event of bowing or expansion of the plates, the squared fins will prevent serious closing of the coolant passage. As seen in FIGURE 2, the pointed fins 19 of succeeding plates (and on opposite sides of the same plate) are not directly opposed, but are slightly offset. The offset fin design improves the flow characteristics of the coolant along the fuel plates. The fins 21 at the end of the fuel plate, adjacent shell 15 are shorter than the remaining fins; we find this will improve heat transfer characteristics of the element by permitting greater coolant flow along the shell. The top of the plate has two short fins while the bottom has three because of the offset position of succeeding plates. It is noted that the fuel plate of FIGURE 3 is but one half of one fuel plate in FIGURE 2 and that the corresponding ends of two fuel plates of the type in FIGURE 3 meet back to back in the middle of the plate in FIGURE 2 to form one composite plate. The reason for this is that it is easier to fabricate the shorter section by extrusion, as indicated below; however, this is not critical and a single fuel plate could be manufactured to span the width of the fuel element frame. Similarly, the fuel plate along its length may be made up of one or several shorter sections, for example four.

Referring now to an alternate embodiment of our invention in FIGURES 6–8, the fuel plate 22 in FIGURE 6 has similar squared and pointed fins 23 and 24 to the embodiment of FIGURES 1–5, and they serve similar functions, the squared fins being spacers. This plate varies, however, in having a relatively larger squared end fin 25 characterized by a tongue-and-groove 26 and 27. The tongues and grooves, or similar interlocking means of succeeding fuel plates 22 interlock as indicated in FIGURE 7 to impart dimensional stability. The plates are assembled in a fuel bundle 28 and held together by circumferential straps 29 of the same metal as the cladding. Except for the tongue-and-groove end piece, the fins adjacent the straps are not in contact therewith, which allows for coolant passage. A number of such bundles 28, for example four, are then inserted into a hollow, rectangular shell 30, shown in FIGURE 8. The bundles merely sit in the shell, one on top of another and are not physically fastened thereto or to each other. This allows for any differential growth between shell 30 and bundles 28, without introduction of stresses. A cross bar and spring (or other flexible support means) similar to that in the previous embodiment may also be used to prevent axial movement or rattling, particularly if coolant flow is upward rather than downward. Downward flow adds to stability and may avoid need for the spring in both embodiments. The fuel element of FIGURE 8 has different head and end pieces 31 and 32 than that in FIGURE 1, the coolant flow through the element being indicated by the arrows.

The fuel core 18 comprises a core of a thermal neutron fissionable material such as uranium or plutonium, either as the metal or an alloy such as uranium-aluminum or uranium-thorium, or a ceramic composition such as uranium oxide or carbide, or a powdered compact such as $UO_2$-stainless steel or $UO_2$-aluminum. The uranium may be natural or enriched in a fissile isotope U–233 or U–235; typically for an organic moderated reactor the uranium will be enriched to a few percent in U–235, for example, approximately 2%. The cladding material will be of a corrosion resistent metal or alloy, such as aluminum, stainless steel or zirconium. In view of the relatively low thermal neutron absorption cross section of aluminum and its generally satisfactory metallurgical characteristics in an organic moderated reactor, it is preferred for this application. To prevent interaction between uranium and aluminum which may result in formation of $UAl_4$, a thin layer (e.g. ½ mil) of nickel may be electroplated on the uranium as a diffusion barrier.

The basic fuel plate may be fabricated in a number of different manners, and the exact manner chosen is not critical. For example, the aluminum cladding portion, with or without the core, has been satisfactorily extruded. If extruded without the core, the core material may then be inserted into the resulting hollow cavity in the plate and the cladding metallurgically bonded to the core by hot pressing in a die with serrations corresponding to those of the cladding. In another method, aluminum may be electrodeposited on the fissile material, and the desired fins introduced by hot pressing with a suitable die. Several metallurgical techniques are applicable. An example is outlined in the Cunningham paper, above.

The following is an example of the physical dimensions of the fuel element of FIGURES 1–6 for use in the OMRE, referred to above, without change of that reactor.

Example I

| | |
|---|---|
| Overall dimensions | 3 in. x 3 in. x 36 in. (active length). |
| Total length with OMRE head and end pieces | 60 in. |
| Plates per fuel element | 6 (3 sections per plate). |
| Fuel plate | 2.8 in. x 2.8 in. wide. |
| Core | .130 in. uranium metal, 2.9% enriched in U–235. |
| Cladding | .020 in. aluminum. |
| Shell | .030 in. stainless steel. |
| Fins | 10 fins/inch. |
| Width | .050 in. base. |
| Space between fins | .050 in. |
| Height | 0.165 in. |
| Spacer length | 0.50 in. |
| Spring | 2 in. length. |
| Fuel loading (total uranium): | |
| Per plate | 3.95 kg. |
| Per element | 23.70 kg. |
| Reactor loading (36 elements) | 853.2 kg. |

Example II

This is an example of the use of our fuel element in another organic moderated power reactor of the characteristics indicated below.

| | |
|---|---|
| Power output: | |
| Net electrical kilowatts | 11,400. |
| Gross electrical kilowatts | 12,500. |
| Gross thermal kilowatts | 45,500. |
| Steam conditions: | |
| Steam pressure, p.s.i.a | 415. |
| Steam temperature, °F | 550. |
| Steam rate, lb./hr | 162,000. |
| Feed water temperature at full load, °F | 337. |
| Condenser cooling water temperature, °F | 70. |
| Reactor cooling: | |
| Coolant | Terphenyl. |
| Coolant pressure, p.s.i.a | 120. |
| System design pressure, p.s.i.a | 300. |
| Coolant inlet temperature, °F | 550. |
| Coolant outlet temperature, °F | 600. |
| Coolant flow rate, lb./hr | $5.1 \times 10^6$. |
| Number of primary loops | 2. |
| Total pressure drop, p.s.i | 50. |
| Coolant cycle time, sec | 40. |
| Pressurizing and degassing flow rate, g.p.m | 200. |
| Reactor characteristics: | |
| Maximum thermal neutron flux, n/cm.²/sec | $3.0 \times 10^{13}$. |
| Average thermal neutron flux, n/cm.²/sec | $2.0 \times 10^{13}$. |
| Maximum heat flux, B.t.u./hr./ft.² | $7.9 \times 10^4$. |
| Total fuel element heat transfer area, ft.² | 7,900. |
| $U^{235}$ enrichment, percent | 1.8. |
| $U^{235}$ loading, kg | 120. |
| Fuel element characteristics: | |
| Core | .130 in. metallic uranium, 1.8% enriched in U–235. |
| Cladding | .020 in. aluminum. |
| Shell | 4.79 in. x 4.79 in. x .030 in., stainless steel. |
| Fins | 10 fins/in. |
| Width | .050 in. at base width. |
| Space between fins | .050 in. |
| Height | .150 in. |
| Fuel plate | 54 in. x 4.76 in. width. |
| Overall length of element | 68 1/16 in. |
| Spring | 2 in. |
| Head piece | 7 9/16 in. |
| End piece | 5 1/8 in. |
| Number plates per element | 20 (4 sections per plate). |
| Number of fuel elements in core | 63. |

The above examples are illustrative rather than restrictive of our invention which is inherently broad. Our invention should be understood to be limited, then, only as indicated by the appended claims.

We claim:

1. A nuclear reactor fuel element comprising a plurality of rectangular fuel plates, each of said plates consisting of a plurality of individual sections, each of said sections having a core of fissionable material with cladding thereon and a plurality of spacer fins on each face of said section, said spacer fins contacting the spacer fins of the adjacent section and defining a plurality of axial coolant channels along the faces of said sections, and means for rigidly supporting said plurality of sections so that said spacer fins are maintained in abutting relationship.

2. The nuclear reactor fuel element of claim 1 wherein each of said fuel plates consists of a plurality of laterally abutting sections and a plurality of axially abutting sections.

3. A nuclear reactor fuel element comprising a plurality of rectangular fuel plates, each of said plates consisting of a plurality of sections, each of said sections having a core of fissionable material with cladding thereon, said cladding having a plurality of axially continuous fins along its faces, each of said sections having a plurality of rectangular fins on each of said faces, said rectangular fins contacting rectangular fins on adjacent sections and defining a plurality of axial coolant channels along the faces of said sections into which said plurality of fins partially extend, and means for rigidly supporting said sections in parallel relationship and against lateral movement relative to each other.

4. The nuclear reactor fuel element of claim 3 wherein said plurality of fins on one face of said section are offset from the plurality of fins on the face of the opposite section.

5. The nuclear reactor fuel element of claim 4 wherein a portion of the plurality of fins at the end of each of said fuel plates is shorter than the plurality of fins across the face of said fuel plates.

References Cited in the file of this patent

UNITED STATES PATENTS

| 2,831,806 | Wigner | Apr. 22, 1958 |
| 2,838,452 | West | June 10, 1958 |

FOREIGN PATENTS

| 768,078 | Great Britain | Feb. 13, 1957 |

OTHER REFERENCES

BMI–959, Oct. 22, 1954.
BMI–983, Feb. 21, 1955.
NAA–SR–1998, Nov. 15, 1957.
GER–1301, Progress Report on Dresden Station, General Electric Co. publication, presented at joint session of Nuclear Engineering and Power Divisions at ASME Annual Meeting, N.Y.C., Nov. 26, 1956, in particular pp. 12–13.
Nuclear Power, May 1957, vol. 2, No. 13, pp. 188–192.
International Conference on Peaceful Uses of Atomic Energy, 1955, vol. 9, pp. 203–207.